(12) United States Patent
Nitta et al.

(10) Patent No.: US 7,561,167 B2
(45) Date of Patent: Jul. 14, 2009

(54) IMAGE PROCESSING APPARATUS AND IMAGE PROCESSING METHOD

(75) Inventors: Takashi Nitta, Chino (JP); Junichi Nakamura, Shiojiri (JP); Shoichi Uchiyama, Shimosuwa-machi (JP); Tsunemori Asahi, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 731 days.

(21) Appl. No.: 11/223,010

(22) Filed: Sep. 12, 2005

(65) Prior Publication Data

US 2006/0055835 A1   Mar. 16, 2006

(30) Foreign Application Priority Data

Sep. 16, 2004   (JP)   ............................. 2004-269674
Jun. 6, 2005    (JP)   ............................. 2005-165202

(51) Int. Cl.
    *G09G 5/02*    (2006.01)
    *G09G 5/10*    (2006.01)
(52) U.S. Cl. .................. 345/603; 345/690; 348/E5.094
(58) Field of Classification Search ................. 345/603, 345/690; 348/E5.094, E9.047
    See application file for complete search history.

(56) References Cited

U.S. PATENT DOCUMENTS

| 5,648,818 | A  | * | 7/1997  | Fukatsu ....................... 348/273 |
| 5,659,358 | A  | * | 8/1997  | Hieda .......................... 348/255 |
| 6,476,877 | B2 | * | 11/2002 | Kihara et al. ................ 348/650 |
| 6,552,702 | B1 | * | 4/2003  | Abe et al. ................... 345/75.2 |
| 2002/0063788 | A1 | * | 5/2002 | Kurashige et al. ........... 348/273 |
| 2004/0169823 | A1 |   | 9/2004 | Bridgwater et al. |

FOREIGN PATENT DOCUMENTS

JP    3523170 B2    2/2004

* cited by examiner

*Primary Examiner*—M Good Johnson
(74) *Attorney, Agent, or Firm*—Oliff & Berridge, PLC

(57) ABSTRACT

An image processing apparatus for controlling a display apparatus including a luminance modulation element and a color modulation element that are configured using different modulation elements, includes: a control value determination unit that determines, based on an input target color value, using a plurality of color conversion matrixes that describe a relationship between the target color value and a control value for the color modulation element for each control value for the luminance modulation element, the control value for the color modulation element; and a correction unit that non-linearly corrects the control value for the color modulation element according to a characteristic of the color modulation element.

13 Claims, 8 Drawing Sheets

US 7,561,167 B2

IMAGE PROCESSING APPARATUS AND IMAGE PROCESSING METHOD

BACKGROUND OF THE INVENTION

1. Field of the Invention

The present invention relates to an image processing apparatus and an image processing method that are suitable to a color management processing or the like to reproduce desired colors in a high dynamic range (HDR) display employing a dual modulation system.

Priority is claimed on Japanese Patent Application No. 2004-269674 filed Sep. 16, 2004, and Japanese Patent Application No. 2005-165202, filed Jun. 6, 2005, the contents of which are incorporated herein by reference.

2. Description of Related Art

In a dual modulation system, an additional modulation system is placed in optical series with a typical single modulation system. Accordingly, a color management processing adapted to the conventional single modulation system cannot be used for a display apparatus employing such a dual modulation system. To address this issue, various solutions have been proposed.

One conventional technique disclosed in Japanese Patent No. 3523170 is a dual modulation system in which a modulation light source is used as one of the modulation systems. The mechanism to modulate the light source employs a combination of a normal illumination using a cold-cathode tube and a modulation illumination by means of white light-emitting diodes (LEDs). Thus, the chromaticity of light from the light source changes in response to the modulation due to the differences in the emission spectra of the cold-cathode tube and the white LEDs. This change in the chromaticity is formulated into the following equation (2). The equation (1) is a transformation formula when normal illumination is provided using the cold-cathode tube.

$$(X,Y,Z)^t = M(R,G,B)^t \quad (1)$$

$$(X,Y,Z)^t = M(R,G,B)^t + gM'(R,G,B)^t = N(R,G,B)^t \quad (2)$$

$$N = M + gM' \quad (3)$$

where R, G, and B represent RGB signals; X, Y, and Z are tristimulus values, M is a 3×3 linear conversion matrix when normal illumination is provided using the cold-cathode tube, M' is a 3×3 linear conversion matrix when illumination is provided using the white LEDs, and "g" is a constant (gain, i.e., a value determined depending on the luminance level of the white LEDs).

However, the equation (3) cannot be used for a case in which the chromaticity changes in response to the modulation, as in the case in which the additional modulation element is a liquid crystal panel, for example. Furthermore, when the modulation takes place using a liquid crystal panel in place of the above-described modulation light source, for example, the chromaticity change exhibits a non-linear behavior, which cannot be expressed by a simple variable such as gM' that represents the white LEDs in the above equation (2).

SUMMARY OF THE INVENTION

As described above, conventional techniques have shortcomings in that achieving color reproduction with higher accuracy is difficult in a modulation element in which the chromaticity changes non-linearly in response to the modulation, such as a liquid crystal panel. The present invention was conceived against the above-described background, and an object thereof is to provide an image processing apparatus and an image processing method that can realize color reproduction with higher accuracy in color management processing for a display apparatus employing the dual modulation system.

In order to solve the above-identifies shortcoming, an aspect of the present invention is an image processing apparatus for controlling a display apparatus including a luminance modulation element and a color modulation element that are configured using different modulation elements, including: a control value determination unit that determines, based on an input target color value, using a plurality of color conversion matrixes that describe a relationship between the target color value and a control value for the color modulation element for each control value for the luminance modulation element, the control value for the color modulation element; and a correction unit that non-linearly corrects the control value for the color modulation element according to a characteristic of the color modulation element. With such an image processing apparatus, it is possible to present precise colors with smaller resource consumption (in other words, with smaller load for operation and preparation of data).

Furthermore, according to another aspect of the present invention, the color conversion matrixes may describe a relationship of the control value for the color modulation element with respect to a color value defined in a display-apparatus-independent color space. With such an image processing apparatus, for example, color matching can be easily accomplished by using the absolute XYZ, QMh, relative XYZ, Lab, JCh, or Luv scheme or the like, as the display-apparatus-independent color space.

Furthermore, according to another aspect of the present invention, the display-apparatus-independent color space may be an absolute XYZ color space. With such an image processing apparatus, since a color space that can express an HDR image is used, an HDR representation that can reproduce natural-looking light can be realized.

Furthermore, according to another aspect of the present invention, the image processing apparatus may further include a transformation unit that coverts a target color value defined in a relative color space into a target color value defined in an absolute color space. With such an image processing apparatus, image processing on target color values defined in a relative color space can be executed using the same system configuration used for processing the absolute color space.

Furthermore, according to another aspect of the present invention, the control value determination unit may select the control value for the luminance modulation element according to the input target color value and select a color conversion matrix of the color conversion matrixes according to the selected control value for the luminance modulation element. With such an image processing apparatus, each control value can be determined rapidly, making implementation of this apparatus into hardware easier.

Furthermore, according to another aspect of the present invention, the control value determination unit may select a plurality of color conversion matrixes corresponding to the plurality of control values for the luminance modulation element to determine a plurality of control values for the color modulation element, select a plurality of color values that is expected to be obtained in the display-apparatus-independent color space based on the plurality of control values for the color modulation element, and determine one of the plurality of values as the control value for the luminance modulation element and the control value for the color modulation elements based on a comparison between the plurality of color values and the input targeted color value. With such an image processing apparatus, since the error from the target is minimized, high-quality image processing can be accomplished.

Furthermore, according to another aspect of the present invention, the control value determination unit may determine a temporary control value for the luminance modulation element based on the input targeted color value, and select the plurality of color conversion matrixes corresponding to control values for the luminance modulation element that fall within a predetermined range with respect to the temporary control value for the luminance modulation element. With such an image processing apparatus, a configuration that accelerates the processing thereby achieving a good balance between the quality image and the processing speed can be easily accomplished.

Furthermore, according to another aspect of the present invention, the control value determination unit may determine a temporary control value for the luminance modulation element according to the input target color value, select a color conversion matrix based on the determined temporary control value for the luminance modulation element, determine the control value for the color modulation elements from the input target color value and the selected color conversion matrix, and determine the control value for the luminance modulation element according to the input targeted color value and the determined control value for the color modulation element. With such an image processing apparatus, the configuration achieving faster processing speed can be easily accomplished.

Furthermore, according to another aspect of the present invention, upon determining the control value for the luminance modulation element according to the input targeted color value and the determined control value for the color modulation element, the control value determination unit may determine a color value that is expected to be obtained in the display-apparatus-independent color space based on the determined control value for the color modulation element, determine a plurality of color values that are expected to be obtained in the display-apparatus-independent color space obtained from the plurality of color conversion matrixes corresponding to the determined color value and a predetermined plurality of control values for the luminance modulation element, and determine the control value for the luminance modulation element based on a comparison with the input targeted color value. With such an image processing apparatus, the configuration achieving higher image quality and faster processing speed can be easily accomplished.

Furthermore, according to another aspect of the present invention, the control value determination unit may use the plurality of color conversion matrixes corresponding to control values for the luminance modulation element that fall within the predetermined range with respect to the temporary control value for the luminance modulation element. With such an image processing apparatus, a configuration that accelerates the processing and thereby achieving a good balance between the quality image and the processing speed can be easily accomplished.

Furthermore, according to another aspect of the present invention, a table that describes a relationship with the control value for the luminance modulation element may be generated for each of a plurality of components included in the targeted color value, a plurality of control values for the luminance modulation element may be determined using the table for the plurality of components, and determines a largest control value of the plurality of control values as the control value for the luminance modulation element. With such an image processing apparatus, the precise color reproduction and the faster processing can be easily accomplished.

Furthermore, according to another aspect of the present invention, the table that describes the relationship with the control value for the luminance modulation element may be made up of values that fall within a color reproduction range in a display-apparatus-independent color space. With such an image processing apparatus, the precise color reproduction and the faster processing can be easily accomplished.

Furthermore, another aspect of the present invention is a method for image processing for controlling a display apparatus including a luminance modulation element and a color modulation element that are configured using different modulation elements, including: determining, based on an input target color value, using a plurality of color conversion matrixes that describe a relationship between the target color value and a control value for the color modulation element for each control value for the luminance modulation element, the control value for the color modulation element; and non-linearly correcting control value for the color modulation elements according to a characteristic of the color modulation element.

DETAILED DESCRIPTION OF THE INVENTION

Figure 1:
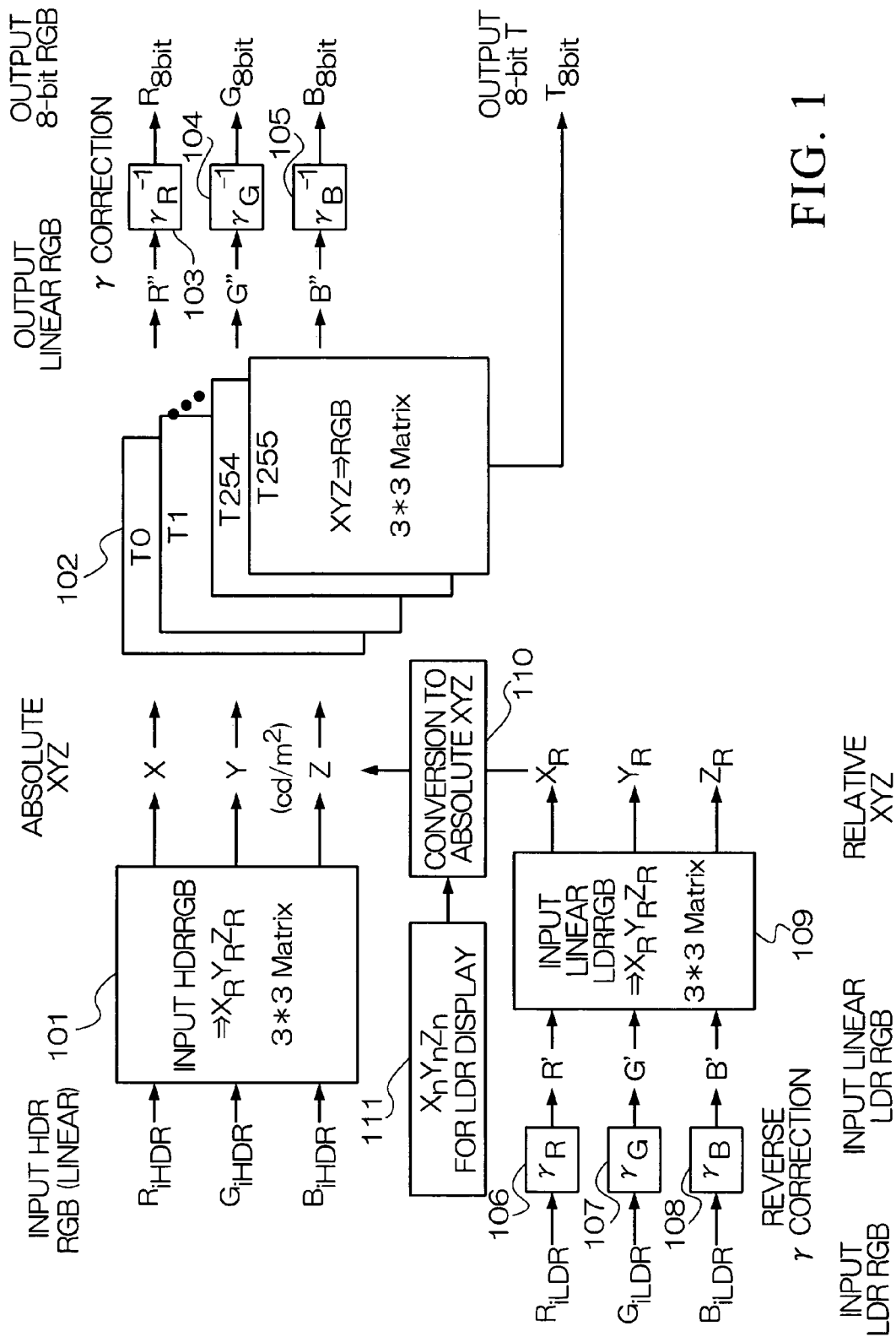
FIG. 1 is a block diagram illustrating operations carried out by an image processing apparatus according to an embodiment of the present invention.
Figure 2:
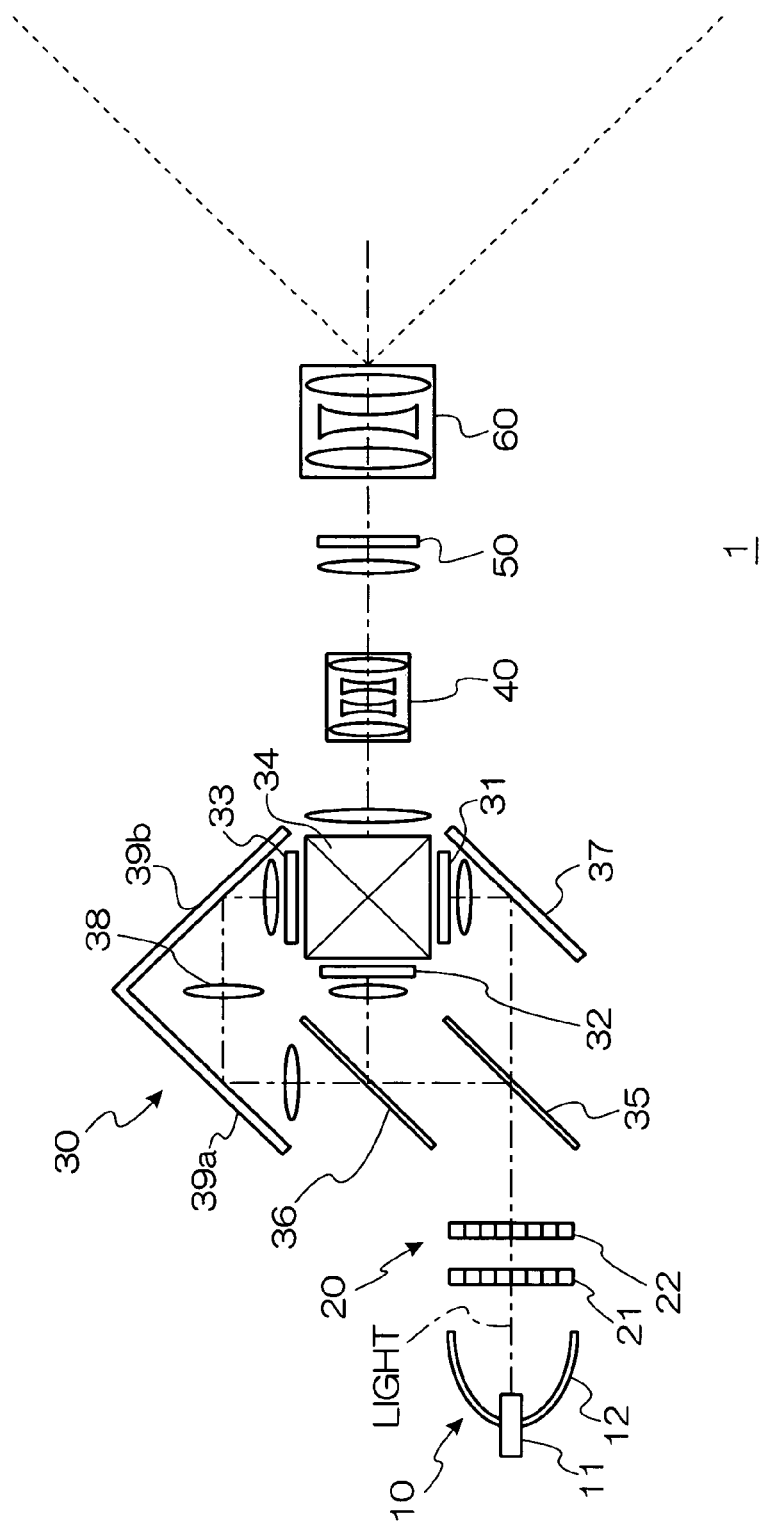
FIG. 2 is a diagram illustrating a configuration of an HDR display used in this embodiment.

Hereinafter, embodiments of the prevent invention will be described with reference to the drawings. The embodiments of the present invention is an arrangement for executing image processing for a display apparatus employing the dual modulation system that has a color modulation element and a luminance modulation element as two separate systems. This arrangement can be configured as a microprocessor system, for example. Alternatively, all or some of the functions of the arrangement can be configured using a general-purpose computer and programs that describe operations of the present invention. Referring to FIG. 1, a block diagram illustrating operations of an image processing apparatus according to an embodiment of the present invention is shown. FIG. 2 shows an example of a configuration of an HDR display used in this embodiment. This embodiment executes image processing for a dual modulation system as shown in FIG. 1. However, before describing the dual modulation system of the present invention, a configuration of a single modulation system will be explained referring to FIG. 7 such that the dual modulation system can be easily understood.

It should be noted that the following systems for defining the XYZ color space (color system) is used in this specification. More specifically, there are two systems for defining the XYZ color space: the absolute XYZ and the relative XYZ. The absolute XYZ converts colors into values using tristimulus values XYZ, in which the Y value represents a luminance value ($cd/m^2$). The relative XYZ converts colors into values using tristimulus values that are normalized with a certain technique. In the relative XYZ color space, in general, a Y value at the neutral point (white point) is normalized to a value of 100 or 1. The XYZ color space is a color system that is adopted as a standard color system by the International Commission on Illumination (CIE).

Figure 7:
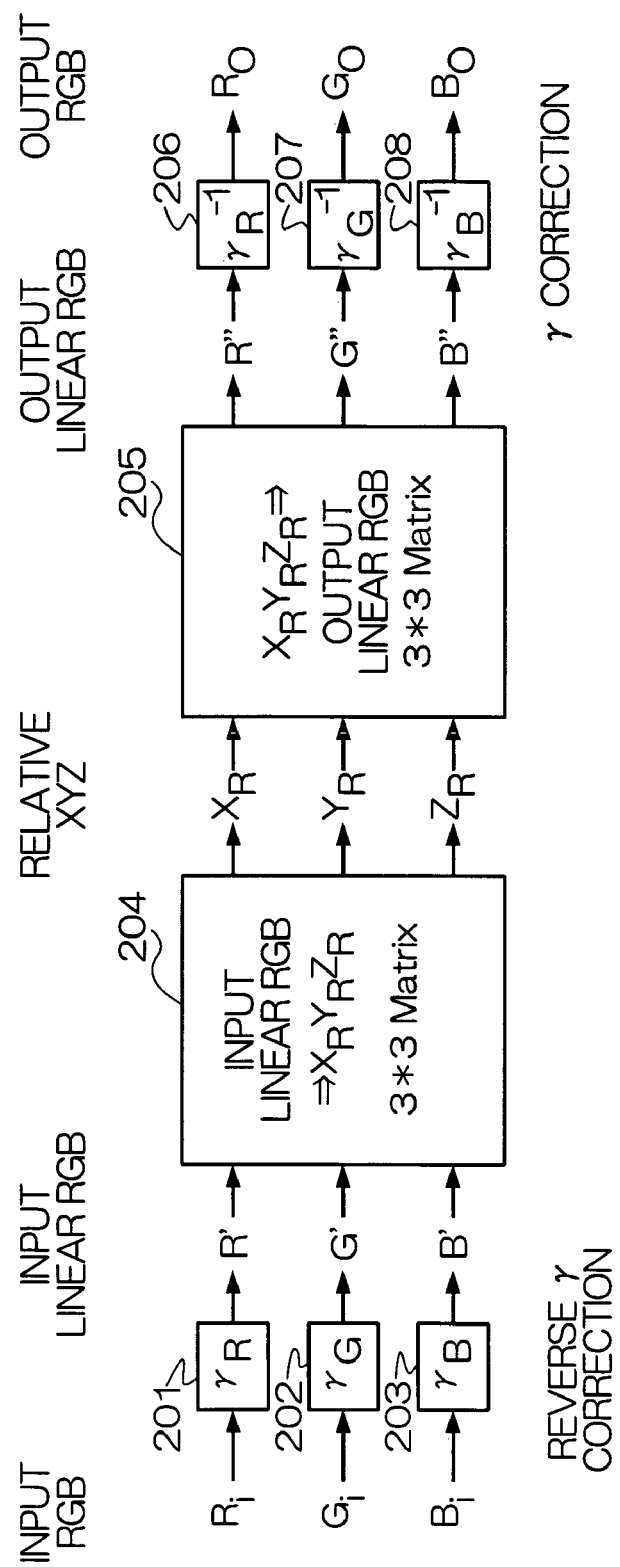
FIG. 7 is a schematic diagram of a display apparatus employing a single modulation system.

An example of operational blocks in a color management system for a conventional liquid crystal display (LCD), which is a single modulation system, will be explained with reference to FIG. 7. The color management system in FIG. 7 coverts input signals $R_iG_iB_i$, i.e., input signals in the RGB (Red-Green-Blue) signal format, into output signals $R_oG_oB_o$ for reproducing the signals on the LCD. By way of example, it is assumed that the input signals $R_iG_iB_i$ are 8-bit sRGB (standard RGB) signals.

Since the sRGB signals are signals to which the inverse gamma (γ) have been applied to make the signals adapted to the gamma of the output-side device (i.e., gamma corrected signals), inverse gamma correction units (i.e., linear transformation units) 201, 202, and 203 execute an inverse gamma correction (i.e., linearization) by performing multiplication with the gamma characteristics to obtain linear R', G', and B' values. The detailed description of the inverse gamma correction (i.e., linearization) for sRGB is omitted herein. The relative $X_R$, $Y_R$, and $Z_R$ values are obtained by processing the resultant linear R', G', and B' with a 3×3 linear sRGB=>$X_RY_RZ_R$ conversion matrix 204 (conversion from the sRGB to the relative $X_RY_RZ_R$). Processing on the resultant the relative $X_R$, $Y_R$, and $Z_R$ with a 3×3 $X_RY_RZ_R$=>output linear RGB inversion matrix 205 obtains output linear values R", G", and B". Gamma correction units (i.e., non-linear transformation units) 206, 207, and 208 multiply the resultant output linear values R", G", and B" by inverse gamma characteristics that are adapted to the gamma characteristic of the output LCD device for performing gamma correction (i.e., non-linearization) to obtain the output values $R_o$, $G_o$, and $B_o$.

The gamma correction is typically performed by using gamma correction tables. By way of example, the 3×3 $X_RY_RZ_R$=>output linear RGB inversion matrix 205 and the gamma correction tables within the gamma correction unit 206, 207, and 208 have been generated based on XYZ values obtained by measuring images displayed on the LCD using a measuring instrument. Since taking measurements for every input value requires considerable amount of time, in general, measurements are taken for input values that are sampled at predetermined intervals (e.g., 0, 8, 16, . . . ), and values in between are interpolated, for example. Furthermore, although signals for the sRGB color space are assumed to be inputs in this example, input signals are not limited to sRGB, and signals of any other color space system may be used as long as the signal can be converted into the relative $X_RY_RZ_R$.

Next, operational blocks of an image processing apparatus according to an embodiment of the present invention will be explained with reference to FIG. 1.

The HDR display used in this embodiment is configured such that three-panel liquid crystal color panels 31, 32, and 33 in the front stage and a single-panel liquid crystal luminance panel 50 in the rear stage are connected in optical series via a relay lens 40, as shown in FIG. 2. This arrangement can operate equally when the relationship between the front stage and the rear stage is reversed. The liquid crystal panels receive three 8-bit signals for each of red (R), green (G), and blue (B), respectively, 24 bits all total, as inputs, and the luminance panel 50 receives an 8-bit luminance signal as an input.

FIG. 2 shows an example of the configuration of the projection type display apparatus. A projection type display device 1 includes a light source 10, a luminance distribution homogenization unit 20, which homogenizes the luminance distribution of the light that is incident upon it from the light source 10, a color modulation unit 20 that modulates the individual luminances in the three primary color wavelength regions R, G and B of the light that is incident upon it from the luminance distribution homogenization unit 20, a relay lens 40 that relays the light that is incident upon it from the color modulation unit 30, a luminance modulation panel 50 that modulates the luminance in all wavelength regions of the light that is incident upon it from the relay lens 40, and a projection lens 60 that projects the light that is incident upon it from the luminance modulation panel 50 onto a screen (not shown in the drawings).

The light source 10 includes a lamp 11 that is a high pressure mercury lamp or the like, and a reflector 12 which reflects the light that is emitted from the lamp 11. A ray bundle emitted from the light source 10 is made the luminance distribution thereof homogenized by the homogenization unit 20 in which a first fly-eye lens 21, a second fly-eye lens 22, or the like, are placed in series.

The uniformly polarized light emitted from the homogenization unit 20 is incident upon a color modulation unit 30 in which the light is separated into three primary colors (R, G, B), each of which is modulated by the liquid crystal color panels 31, 32, and 33 that modulate each color component.

The modulated light in the three primary colors (R, G, B) is combined by a cross dichroic prism 34 and is exit to a relay lens 40. The liquid crystal color panel 31 forms a modulation element for the R component, the liquid crystal color panel 32 forms a modulation element for the G component, and the liquid crystal color panel 33 forms a modulation element for the B component. A dichroic mirror 35 transmits light of the R component, and a dichroic mirror 36 transmits light of the B component. Furthermore, a reflecting mirror 37 is provided for the liquid crystal color panel 31, and a relay lens 38 and two reflecting mirrors 39a and 39b are provided for the liquid crystal color panel 33.

The modulated light emitted from the relay lens 40 incidents upon another liquid crystal luminance panel 50, in which a second modulation is took place. The liquid crystal luminance panel 50 modulates the luminance in all wavelength regions of the light that is incident upon it, and the modulated light is emitted to the projection lens 60 and is projected onto a screen (not shown in the drawings) by the projection lens 60.

In this manner, the projected image is formed by the light modulated on a pixel-by-pixel basis by respective light modulation elements (the liquid crystal luminance panel 50 and the liquid crystal color panels 31, 32, and 33) that are arranged in optical series.

First, the operations by the image processing apparatus shown in FIG. 1 when the image signal $R_{iHDR}G_{iHDR}B_{iHDR}$ in the hdr format, which is one of HDR image formats, is received as an input (shown in the upper light corner in FIG. 1). Since the signal $R_{iHDR}G_{iHDR}B_{iHDR}$ is inherently linear, no inverse gamma correction is required. Thus, the signal $R_{iHDR}G_{iHDR}B_{iHDR}$ is processed by a 3×3 input HDRRGB=>XYZ conversion matrix 101 to obtain an XYZ value (in the absolute XYZ). The thus obtained absolute XYZ value represents target colors to be displayed.

Although the absolute XYZ value is used in this embodiment, the color space is not limited to the absolute XYZ. Like the absolute XYZ, any color space that allows device-independent color representation facilitates color management, and various device-independent color spaces, such as the QMh, relative XYZ, Lab, JCh, or Luv color space, or the like, may be used. The absolute XYZ is used in this embodiment, and this is because when a color space that requires normalization with respect to the neutral point (e.g., the Lab, the relative $X_RY_RZ_R$, or the like) is used for a system that displays an HDR image with a very high brightness, such as an HDR display. In such a case, since the neutral point may be mapped to the maximum luminance value, the displayed image may be presented unnatural. Furthermore, with regards to reproduction of light, which is one of advantages of the HDR, the absolute value of the luminance is quite an important factor.

In other words, the definition of the neutral point is not compatible with the HDR. For the above reasons, the absolute XYZ is employed in this embodiment.

Next, output values are obtained from the absolute XYZ values. It has been known that the chromaticity of a liquid crystal panel changes according to the gradation. The hardware configuration of this embodiment also suffers from chromaticity shift caused by a combination of chromaticity shift due to the gradation of the single-panel liquid crystal luminance panel 50 and chromaticity shift due to the gradation of the liquid crystal color panels 31, 32, and 33. Thus, in this embodiment, for each of the T values, which are values used to control the luminance of the single-panel liquid crystal luminance panel 50 (in this embodiment, they are denoted by $T_{8bit}$, assuming that they are 8-bit values), a group 102 of the absolute XYZ=>output linear RGB conversion matrixes, which consists of 256 absolute XYZ=>output linear RGB conversion matrixes, is used for the processing for obtaining the output linear value R"G"B". Since it is sufficient to consider only the gamma characteristic of the color panels for the gamma correction of the linear R"G"B" values into the output 8-bit RGB values ($R_{8bit}$, $G_{8bit}$, $B_{8bit}$) performed by gamma correction units 103, 104, and 105, it is suffice to provide only a single gamma correction table. It should be noted, however, that retaining gamma characteristics for each of the T values can further enhance the accuracy.

In such a system configuration for an HDR display having four dimensional parameters of R, G, B, and T, an accurate color management can be achieved with provision of a very small amount of data. An alternative color management technique is a look up table (LUT) method in which various measurements of RGBT are actually taken to generate a table. This technique is quite impractical, however, since a large number of measurement points are required when the RGBT scheme is used. In contrast, in this embodiment, in order to prepare a conversion matrix for each T value, it is sufficient to measure the absolute XYZ values of the maximum values $R_{max}$ (255, 0, 0), $G_{max}$ (0, 255, 0), and $B_{max}$ (0, 0, 255) of each component of RGB for a certain T value. In other words, the maximum number of measurement patterns to be taken is 768, i.e., 3×256=768, for T values ranging from 0 to 255 for each of R, G, and B. However, in the case of a liquid crystal panel in which the black K value (0, 0, 0) is not completely black, the K value for black is required to be measured for each T value, requiring 1,024 patterns to be measured in total (i.e., 4×256=1,024).

Furthermore, the interpolation technique that has been described above with reference to FIG. 7 may be used, and in such a case, it is possible to further reduce the number of measurement patterns. In this embodiment, 33 T values at intervals of eight (i.e., 0, 7, 15, . . . , 247, 255) may be sampled and 132 patterns (i.e., 4×33=132) may be measured. The conversion matrix values for other T values may be calculated by interpolation. A particular interpolation technique employed may be a simple linear interpolation when the measurement interval is sufficiently small as in this example; alternatively, the spline interpolation or the polynomial approximation may be used.

The matrix operation will be explained in further detail. It is assumed that four parameters of $R_{max}$, $G_{max}$, $B_{max}$, and K are measured at a certain T value (T=128 in this example), and each absolute XYZ value is as follows: the XYZ value of $R_{max}=(X_R, Y_R, Z_R)$, the XYZ value of $G_{max}=(X_G, Y_G, Z_G)$, the XYZ value of $B_{max}=(X_B, Y_B, Z_B)$, and the XYZ value of K=$(X_K, Y_K, Z_K)$.

Using the values of these four parameters, the relationship between the output linear value R"G"B" for the color panels and the absolute XYZ value to be displayed when T=128 can be expressed by the following equation (4):

$$\begin{pmatrix} X \\ Y \\ Z \end{pmatrix} = \begin{pmatrix} X'_R & X'_G & X'_B \\ Y'_R & Y'_G & Y'_B \\ Z'_R & Z'_G & Z'_B \end{pmatrix} \begin{pmatrix} R'' \\ G'' \\ B'' \end{pmatrix} + \begin{pmatrix} X_K \\ Y_K \\ Z_K \end{pmatrix} \quad (4)$$

where $X_R'=X_R-X_K$, $Y_R'=Y_R-X_K$, $Z_R'=Z_R-Z_K$, $X_G'=X_G-X_K$, $Y_G'=Y_G-X_K$, $Z_G'=Z_G-Z_K$, $X_B'=X_B-X_K$, $Y_B'=Y_B-X_K$, and $Z_B'=Z_B-Z_K$.

Conversely, by modifying the equation (4), the absolute XYZ can be converted to the output linear value R"G"B" using the following equation (5).

$$\begin{pmatrix} R'' \\ G'' \\ B'' \end{pmatrix} = \begin{pmatrix} X'_R & X'_G & X'_B \\ Y'_R & Y'_G & Y'_B \\ Z'_R & Z'_G & Z'_B \end{pmatrix}^{-1} \begin{pmatrix} X - X_K \\ Y - Y_K \\ Z - Z_K \end{pmatrix} \quad (5)$$

Conversion from the absolute XYZ to the output linear value R"G"B" and vice versa can be performed using the above two equations. Furthermore, it is also possible to convert between the absolute XYZ and the output linear value R"G"B" for each of the T values, since the above-described conversion matrix and the K vector are retained for a respective T value.

As for measurements to generate a gamma correction table used for gamma correction, the changes in the R, G, and B values are measured when T is set to 255 (the value with maximum transmittance), and the values are normalized such that the values of $R_{max}$, $G_{max}$, and $B_{max}$ are 1. The measurement intervals of eight, as used in the conventional technique shown in FIG. 7, is suffice, and values in between are calculated by interpolation. Alternatively, as used upon determining the conversion matrix, the gamma characteristic may be measured while varying the T value, and a gamma correction table corresponding to the T values may be generated. Since the gamma characteristic is less affected by the T value, a value of T=255 may be adequately used. However, even if measurements are taken while varying the T value, not many T values are required to be measured. Thus, additional manpower required for taking the measurements remain small.

Next, a case in which the system receives low dynamic range (LDR) image signals as inputs, as shown in the lower left corner of FIG. 1, will be explained. In general, such LDR signals are relative color space values. By way of example, sRGB image signals are received as the LDR image signals in this embodiment. In response to input LDR image signal $R_{iLDR}G_{iLDR}B_{iLDR}$ being received as a input, inverse gamma correction units 106, 107, and 108 inverse gamma correct the signals into input linear LDR image signal R'G'B'. Next, the input linear LDR image signal R'G'B' is processed using a conversion matrix 109 to obtain the relative value $X_R Y_R Z_R$. The description of the inverse gamma correction for the sRGB and the relative $X_R Y_R Z_R$ conversion matrix will be omitted.

In the configuration shown in FIG. 1, the resultant relative value $X_R Y_R Z_R$ is required to be converted into the absolute value XYZ, i.e., the device-independent color space value of this color management system. In such a case, an $X_n Y_n Z_n$ setting unit for LDR display 111 sets the maximum display luminance value $X_n Y_n Z_n$, and a conversion to absolute XYZ unit 110 multiplies the relative value $X_R Y_R Z_R$ by the $X_n Y_n Z_n$ value to obtain the absolute value XYZ. In the arranged described above, it is possible to process an HDR image and an LDR image in the same color management system, and thus, the efficiency is improved. More specifically, when the relative value $X_R Y_R Z_R$ is normalized such that the value of white (the brightest value) is 100, the absolute value XYZ can be calculated using the following equations.

$$X = X_R \times X_n / 100$$

$$Y = Y_R \times Y_n / 100$$

$$Z = Z_R \times Z_n / 100$$

Although the maximum display luminance value $X_n Y_n Z_n$ may be any value, a luminance ranging between 200 and 10,000 (cd/m$^2$) is deemed appropriate for displaying a typicall sRGB image. For example, if a color having 1,000 (cd/m$^2$) and the xy chromaticity of (0.333, 0.333) is selected, the $X_n Y_n Z_n$ value is (1000, 1000, 1000). In this case, when the relative $X_R Y_R Z_R$ value is (10, 50, 70), the absolute XYZ values is (100, 500, 700).

Figure 3:
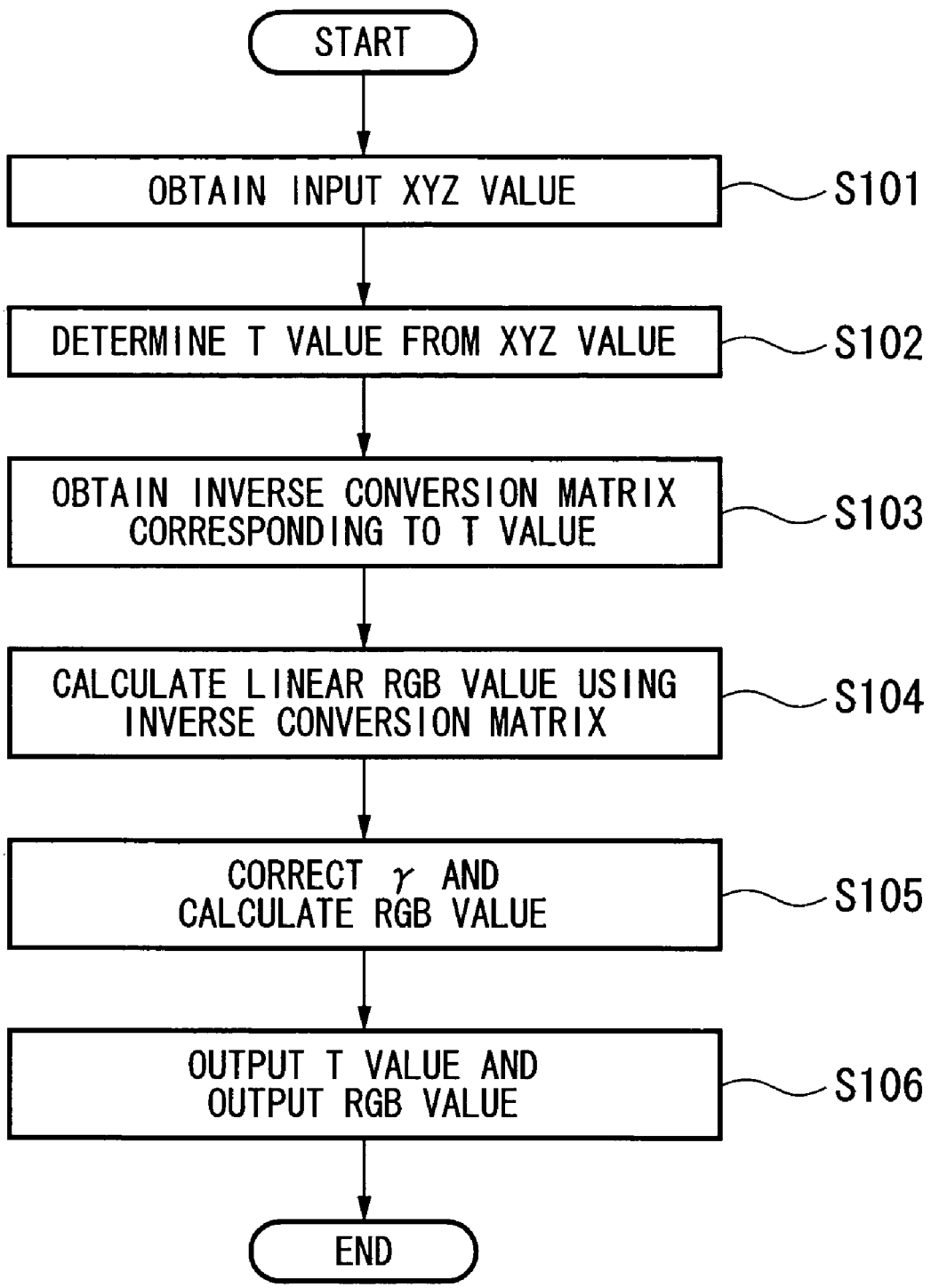
FIG. 3 is a flowchart illustrating an example of a flow of the operations carried out in the embodiment shown in FIG. 1.

Next, flows of operations in this embodiment will be explained with reference to flowcharts shown in FIGS. 3 to 6. FIG. 3 is an operational flowchart in which the T value corresponding to an input pixel value is determined, and the values for the color modulation elements are calculated from the input pixel value and the conversion matrix corresponding to the T value. An absolute XYZ value is determined from an input HDR or LDR pixel value using the operations described previously (step S101). The T value is determined from the XYZ value (step S102). Various techniques may be used for determining the T value. For example, a table that describes relationships between XYZ values and corresponding T values may have been generated beforehand, and the T value may be selected by looking up this table. Alternatively, the T value may be determined by evaluating the T value in a loop, which will be described later.

Next, an XYZ=>linear RGB conversion matrix (and a K vector) corresponding to the determined T value are obtained (step S103). A linear RGB value is then calculated using the equation (5) (step S104), which is gamma corrected to obtain an output RGB value (step S105). The T value and the output RGB values are output to the liquid crystal luminance panel 50 and the liquid crystal color panels 31, 32, and 33, respectively (step S106). This operational flow is quite simple, and can be easily implemented in hardware; thus, higher performances are expected to be obtained with such a hardware implementation.

Figure 4:
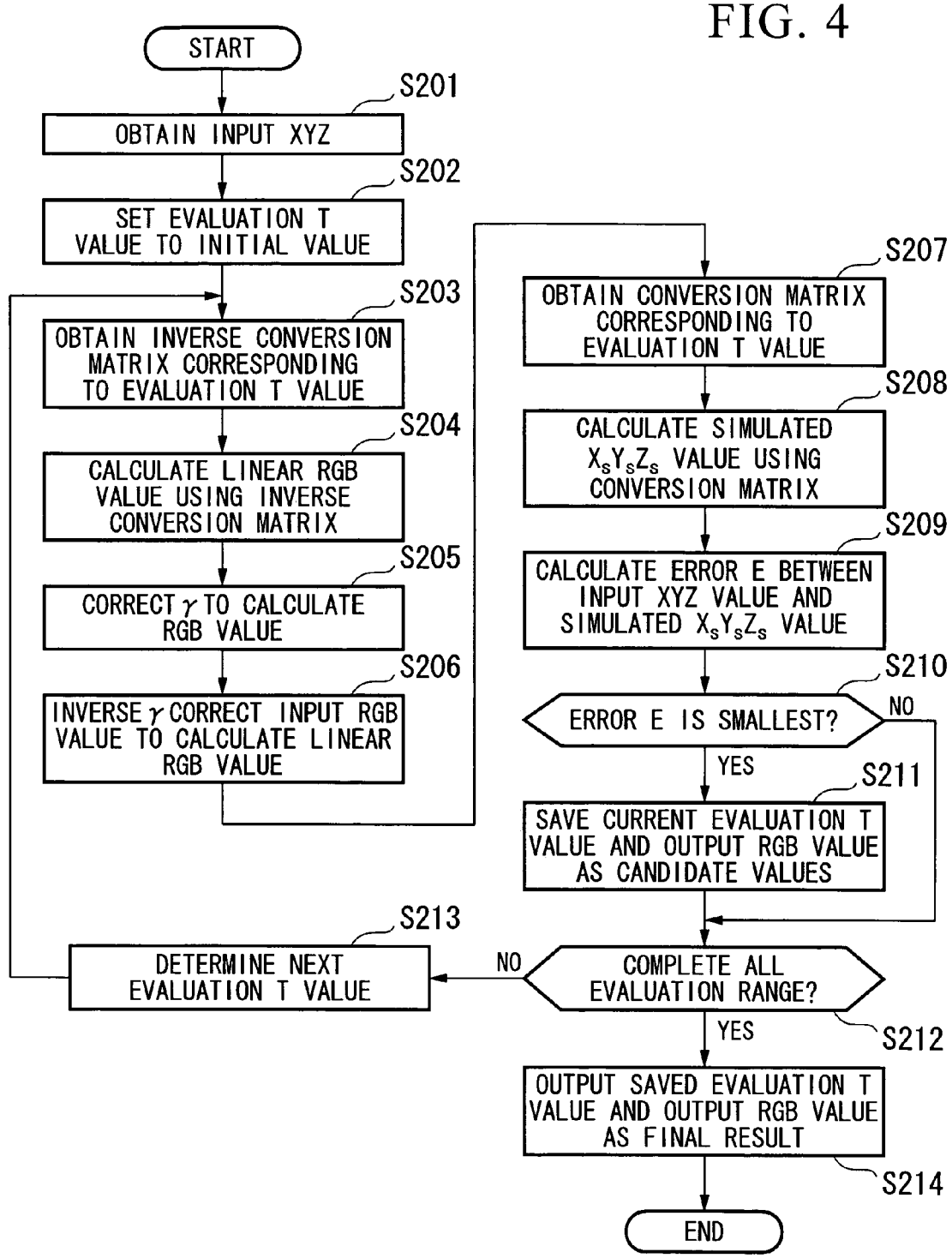
FIG. 4 is a flowchart illustrating another example of a flow of the operations carried out in the embodiment shown in FIG. 1.

Next, FIG. 4 is an operational flowchart for determining the T value by evaluating it in a loop. More specifically, a plurality of values for the color modulation elements are determined from a plurality of T values and the corresponding conversion matrix. From these resultant values, an error between a display simulated value and the input pixel value is calculated, and the T value and the values for the color modulation elements that give the smallest error are determined as display values. In other words, the basic idea of the operations shown in FIG. 4 is that, instead of directly deriving the final T value from the input XYZ value, a plurality of T values are evaluated to select one T value that gives a resultant display closest to the input XYZ value.

First, an absolute XYZ value is determined from an input HDR or LDR pixel value using the operations described previously (step S201). Next, an initial value of the T value is determined for evaluation of a plurality of T values (step S202). Since a single-panel luminance panel takes an 8-bit value in this embodiment, the T value can be values ranging from 0 to 255 and the initial value of the T value is set to 0. Next, an XYZ=>linear RGB conversion matrix (and a K vector) corresponding to the evaluation T value (the T value being evaluated) is obtained (step S203). A linear RGB value is then calculated using the equation (5) (step S204), and is gamma corrected to obtain an output RGB value (step S205). Next, how close a display obtained by the selected T value and the calculated output RGB value to the input XYZ value is evaluated by calculating an error between them. To do this, the output RGB value is required to be inverse gamma corrected to obtain a linear RGB value (step S206). The thus obtained linear RGB value may be different from the previous linear RGB value. This is because the actual output RGB value is an 8-bit discrete value and may not be an ideal value, and because the value may exceed the range limit. This deviation in the linear RGB values is the primary cause of errors.

Next, a linear RGB=>absolute XYZ conversion matrix corresponding to the evaluation T value is obtained (step S207), and a calculation is carried out using the equation (4) to obtain a simulated $X_s Y_s Z_s$ value, which is a simulated value of the display result (step S208). The error between the input XYZ value and the simulated XsYsZs value is calculated (step S209). The error can be determined using various methods, and in this embodiment, the following equation (6) is used for this calculation.

$$\text{Error } E = \sqrt{((X - X_s)^2 + (Y - Y_s)^2 + (Z - Z_s)^2)} \quad (6)$$

When the error E is the smallest ("Y" in step S210), the current T value and the output RGB value are retained as output candidate values (step S211). Then, the T value is changed to the next value, and the above-described processes are repeated to evaluate the error in the similar manner ("N" in step S212, step S213, and steps beginning from S203). Once evaluation of all of the T values to be evaluated is completed ("Y" in step S212), since the output candidate values are a combination of the T value and the output RGB value that give the smallest error from the input XYZ value, the values are output to the luminance panel and the color panels (step S214). In this embodiment, a combination of the T value and the output RGB value that gives a result closest to the input XYZ value is obtained by evaluating the various T values ranging from 0 to 255, i.e., evaluating 256 of T values. Thus, more accurate color management can be realized compared to the method shown in FIG. 3 in which the T value is simply determined from the XYZ value using a table or the like.

However, this method executes a number of evaluations of the error, i.e., 256 times in this example, and thus, it requires longer processing time. To shorten the processing time, an improved version of this embodiment is provided and will be explained in the following.

In this process, a temporary T value is determined from the input pixel value, and the value of the error is calculated for T values that fall within a predetermined range with respect to this temporary T value. The T value and the values for the color modulation elements that give the smallest error are selected as the display values. In this method, first, a temporary T value is determined, and the display values are determined by evaluating T values that fall within the predetermined range with respect to this temporary T value. By way of example, this temporary T value is determined to be 128, and values that fall within a range of ±8 with respect to this value, i.e., 17 values between 120 and 136, are evaluated to obtain an optimum combination of the T value ranging from 120 to 136 and the output RGB value. This embodiment allows faster color management than the embodiment that has been described with reference to FIG. 4, and enables more accurate color management than the embodiment in which evaluation of T values is not performed, thereby achieving a good balance between quality image and processing speed. Various techniques may be used for determining the temporary T value, which will be described later.

Figure 5:
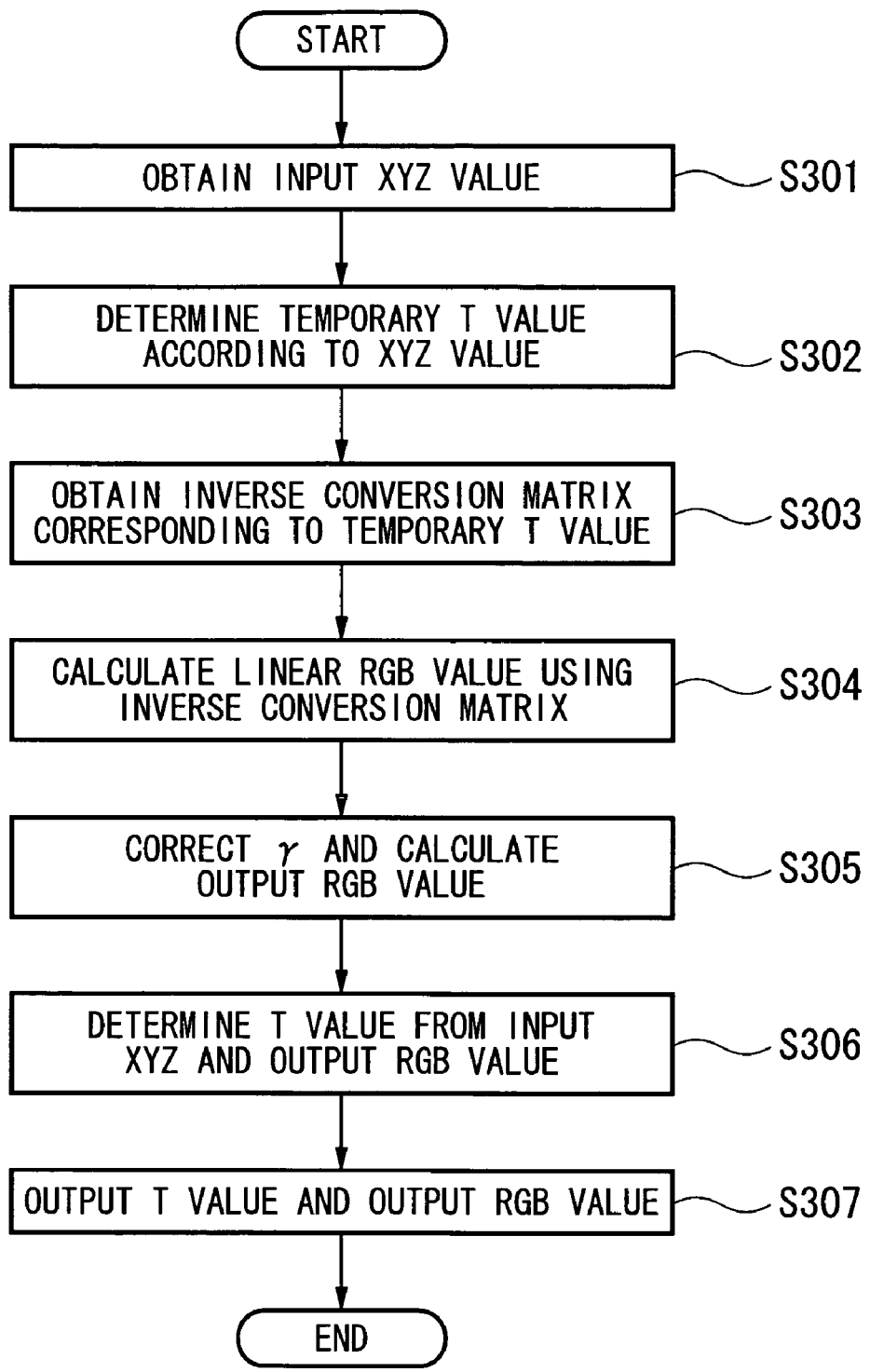
FIG. 5 is a flowchart illustrating a further example of a flow of the operations carried out in the embodiment shown in FIG. 1.

FIG. 5 is an operational flowchart in which a temporary T value is determined from the input pixel value, the values of the color modulation elements are calculated from the input pixel value and the conversion matrix corresponding to the temporary T value, and then the T value is determined from the input pixel value and the determined values for the color modulation elements. In other words, the basic idea is that a temporary T value is determined to obtain the output RGB value, and this T value is corrected using the determined output RGB value to determine the final T value. An absolute XYZ value is determined from an input HDR or LDR pixel value using the operations described previously (step S301). A temporary T value is determined from the XYZ value (step S302). Various techniques may be used for determining the temporary T value, which will be described later. Next, an XYZ=>linear RGB conversion matrix (and a K vector) are obtained for the temporary T value (step S303). A linear RGB value is then calculated using the equation (5) (step S304), and is gamma corrected to obtain an output RGB value (step S305). The final T value is determined from the obtained output RGB value and the input XYZ value (step S306), and the T value and the output RGB value are output to the liquid crystal luminance panel and the liquid crystal color panels, respectively (step S307).

Various methods may be used to determine the final T value, and one technique involves calculating an error between a display simulated value to be displayed and the input pixel value, using a plurality of T values and the determined color modulation element value, and determining the value for the color modulation elements that give the smallest error. Upon calculating the error, the error value may be calculated using T values that fall within the predetermined range with respect to this temporary T value, and the T value that gives the smallest error may be selected as a display value.

Figure 6:
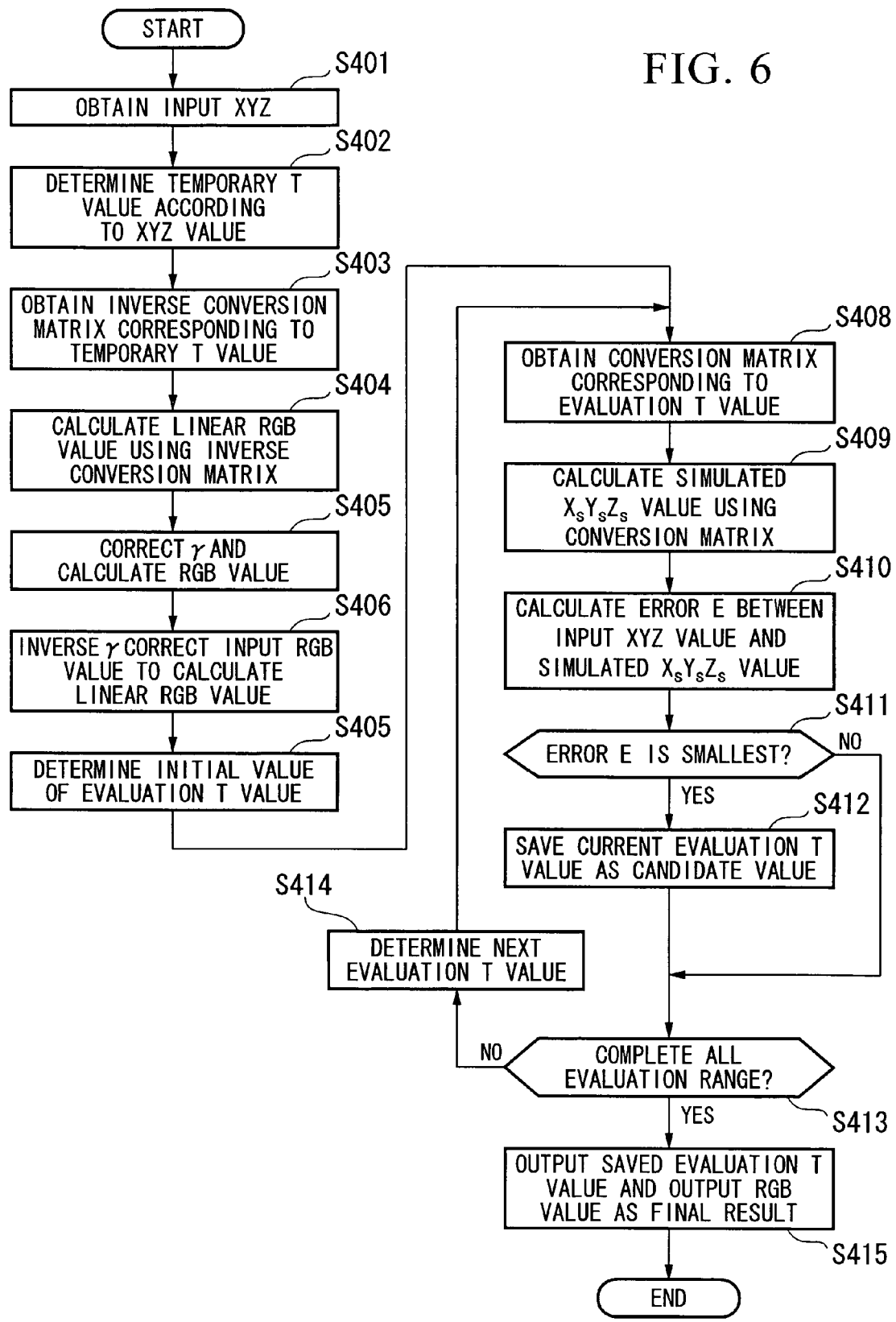
FIG. 6 is a flowchart illustrating a further example of a flow of the operations carried out in the embodiment shown in FIG. 1.

FIG. 6 is a flowchart illustrating a method for determining the T value. The basic idea is that a simulated XYZ value is determined from the output RGB value and a plurality of T values (steps S401 to S409), and the T value that gives the smallest error from the input value is determined as the final T value (steps S410 to S414, steps S414 to S408, and steps S408 to S415). In FIG. 6, steps S401 to S405 are similar to steps S301 to S305 shown in FIG. 5, steps S406 and S407 are similar to steps S206 and S202 shown in FIG. 4, and steps following S408 are similar to steps following step S207 shown in FIG. 4, and the description of these steps will be omitted.

The initial value of the T value in FIG. 6 can be set to a temporary value that has been determined when the resolutions of the two types of panel are the same. Otherwise, when the resolutions of the two types of panel are different, an input XYZ value corresponding to the resolution of the luminance panel may be obtained, and a temporary T value may be determined once again as the initial value based on the input XYZ.

Figure 8:
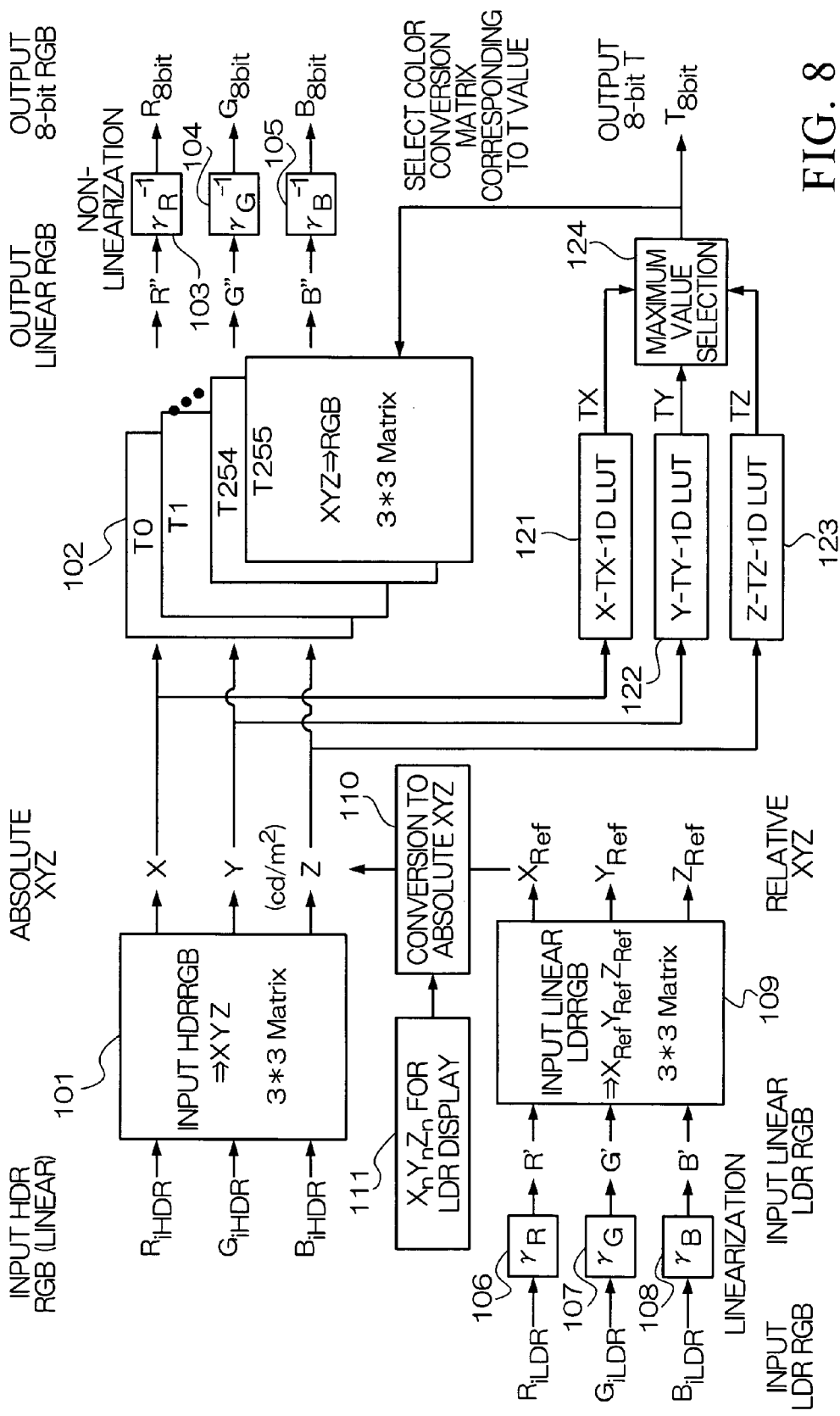
FIG. 8 is a block diagram illustrating in more detail the operations for selecting a T value shown in FIG. 1.

Next, a method for determining the T value or determining the temporary T value based on the input XYZ value will be explained. In the method for determining the T value according to this embodiment, for each X, Y, and Z value of the input XYZ, tables corresponding to the T value, i.e., an X-TX-1DLUT 121, a Y-TY-1DLUT 122, and a Z-TZ-1DLUT 123 shown in FIG. 8, are generated, and the T value is determined by looking up these tables. More specifically, a value of $T_X$ for a certain input X value is determined by looking up the table of the X-TX-1DLUT 121, a value of $T_Y$ for a certain input Y value is determined by looking up the table of the Y-TY-1DLUT 122, and a value of $T_Z$ for a certain input Z value is determined by looking up the table of the Z-TZ-1DLUT 123. Then, a maximum value selection unit 124 selects the largest value among the $T_X$, $T_Y$, and $T_Z$ values that have determined by looking up each of the tables, and the selected value is determined as the output T value. Furthermore, for relation tables between the T values and the respective X, Y, and Z values, among values that have been measured when the conversion matrixes for each T value is generated, the X values of the primary color R (255, 0, 0) are used as the X values corresponding to each T value, the Y values of the primary color G (0, 255, 0) are used, and the Z values of the primary color G (0, 0, 255) are used. Using this method, the T value having the corresponding input XYZ value that falls within the color reproduction range can be quickly determined. The method for determining the T value is not limited to the particular technique described above. Using the thus selected T value, the corresponding absolute XYZ=>output linear RGB conversion matrix is selected among the group 102 of the absolute XYZ=>output linear RGB conversion matrixes.

As stated above, according to various embodiments of the present invention, in a dual modulation system display apparatus having a luminance modulation element and a color modulation element, color management is carried out by using plural color conversion matrixes that describe the relationship between a target color value and the value for the color modulation element for each T value of the luminance modulation element. Thus, it is possible to present precise colors with smaller resource consumption (in other words, with smaller load for operation and preparation of data).

It should be noted that embodiment of the present invention are not limited to the above-described embodiments. For example, operational blocks may be divided or combined; alternatively, the number of input bits, the number of output bits, the number of bits operated can be modified according to requirement. Furthermore, although the above-described embodiments have been explained by using a transmission type liquid crystal panel as an example of the modulation elements, other modulation elements, such as a digital micro mirror device (DMD), a grating light bubble (GLV), a liquid crystal on silicon (LCOS), or a modulation light source (i.e., an LED, an OLED, a laser light source, or the like) may be used.

Furthermore, various elements of the embodiments may be configured as follows: the liquid crystal luminance panel 50 as a luminance modulation element; the liquid crystal color panels 31, 32, and 33 as a color modulation element; the group 102 of the absolute XYZ=>output linear RGB conversion matrixes as a plurality of color conversion matrixes; the gamma correction units 103, 104, and 105 as correction units; and the conversion to absolute XYZ unit 110 as a transformation unit. Other elements shown in FIG. 1 or some or all of the operations in the steps shown in FIGS. 3 to 6 may correspond to a control value determination unit. Furthermore, the T value corresponds to a control value for the luminance modulation element, the XYZ value (or $R_{iHDR}G_{iHDR}B_{iHDR}$) corresponds to an input target color value, and the R"G"B" value (or $R_{8bit}G_{8bit}B_{8bit}$) corresponds to a control value for the color modulation element.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image processing apparatus for controlling a display apparatus comprising a luminance modulation device and a color modulation device that are configured using different modulation devices, the image processing apparatus comprising:

a control value determination unit configured to determine a control value for the color modulation device, based on an input target color value, using a plurality of color conversion matrixes, prepared in advance and retained for each control value for the luminance modulation device, that describe a relationship between the target color value and the control value for the color modulation device; and a correction unit configured to non-linearly correct the control value for the color modulation device according to a characteristic of the color modulation device.

2. The image processing apparatus according to claim 1, wherein the color conversion matrixes describe a relationship of the control value for the color modulation device with respect to a color value defined in a display-apparatus-independent color space.

3. The image processing apparatus according to claim 2, wherein the display-apparatus-independent color space is an absolute XYZ color space.

4. The image processing apparatus according to claim 3, further comprising a transformation unit that converts a target color value defined in a relative color space into a target color value defined in an absolute color space.

5. The image processing apparatus according to claim 1, wherein the control value determination unit selects the control value for the luminance modulation device according to the input target color value and selects a color conversion matrix of the color conversion matrixes according to the selected control value for the luminance modulation device.

6. The image processing apparatus according to claim 5, wherein the control value determination unit selects a plurality of color conversion matrixes corresponding to the plurality of control values for the luminance modulation device to determine a plurality of control values for the color modulation device, selects a plurality of color values that are expected to be obtained in the display-apparatus-independent color space based on the plurality of control values for the color modulation device, and determines one of the plurality of values as the control value for the luminance modulation device, and the control value for the color modulation devices based on a comparison between the plurality of color values and the input targeted color value.

7. The image processing apparatus according to claim 6, wherein the control value determination unit determines a temporary control value for the luminance modulation device based on the input targeted color value, and selects the plurality of color conversion matrixes corresponding to control values for the luminance modulation device that fall within a predetermined range with respect to the temporary control value for the luminance modulation device.

8. The image processing apparatus according to claim 5, wherein, upon determining the control value for the luminance modulation device is generated for each of a plurality of components included in the targeted color value, a plurality of control values for the luminance modulation device are determined using the table for the plurality of components, and determines a largest control value of the plurality of control values as the control value for the luminance modulation device.

9. The image processing apparatus according to claim 8, wherein the table that describes the relationship with the control value for the luminance modulation device is made up of values that fall within a color reproduction range in a display-apparatus-independent color space.

10. The image processing apparatus according to claim 1, wherein the control value determination unit determines a temporary control value for the luminance modulation element according to the input target color value, selects a color conversion matrix based on the determined temporary control value for the luminance modulation device, determines the control value for the color modulation devices from the input target color value and the selected color conversion matrix, and determines the control value for the luminance modulation device according to the input targeted color value and the determined control value for the color modulation device.

11. The image processing apparatus according to claim 10, wherein, upon determining the control value for the luminance modulation device according to the input targeted color value and the determined control value for the color modulation device, the control value determination unit determines a color value that is expected to be obtained in the display-apparatus-independent color space based on the determined control value for the color modulation device, determines a plurality of color values that are expected to be obtained in the display-apparatus-independent color space obtained from the plurality of color conversion matrixes corresponding to the determined color value and a predetermined plurality of control values for the luminance modulation device, and determines the control value for the luminance modulation device based on a comparison with the input targeted color value.

12. The image processing apparatus according to claim 11, wherein the control value determination unit uses the plurality of color conversion matrixes corresponding to control values for the luminance modulation device that fall within the predetermined range with respect to the temporary control value for the luminance modulation device.

13. A method for image processing for controlling a display apparatus comprising a luminance modulation device and a color modulation device that are configured using different modulation devices, the method comprising:

determining a control value for the color modulation device, based on an input target color value, using a plurality of color conversion matrixes, prepared in advance and retained for each control value for the luminance modulation device, that describe a relationship between the target color value and the control value for the color modulation devices;

non-linearly correcting the control value for the color modulation devices according to a characteristic of the color modulation device; and controlling the color modulation device based on the corrected control value for the color modulation device.

* * * * *